June 18, 1935.　　　　H. M. EBNER　　　　2,005,415
FOLDING BERRY BOX
Filed Sept. 18, 1933　　　2 Sheets-Sheet 1
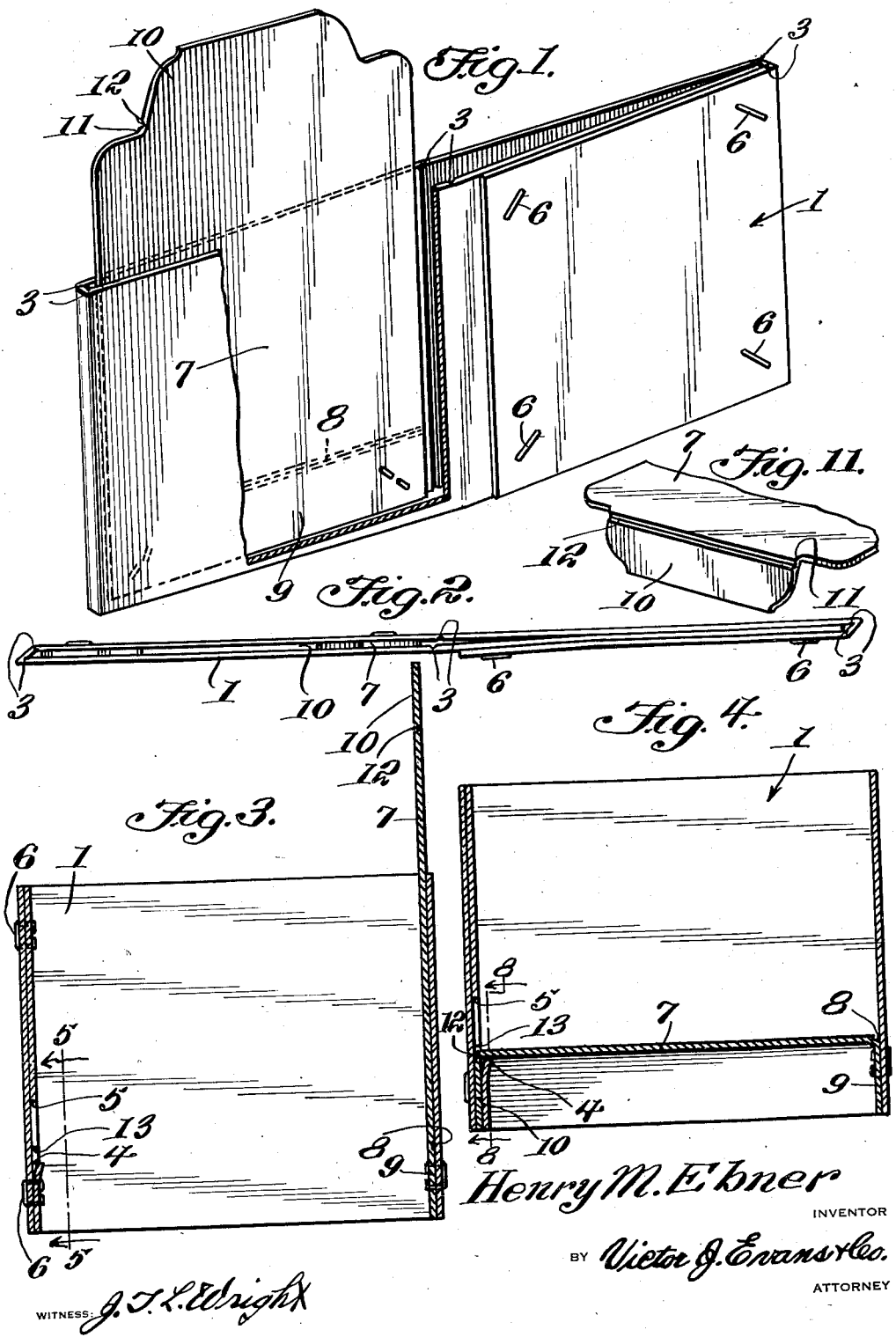
Henry M. Ebner
INVENTOR June 18, 1935.                H. M. EBNER                2,005,415
                            FOLDING BERRY BOX
                        Filed Sept. 18, 1933           2 Sheets-Sheet 2
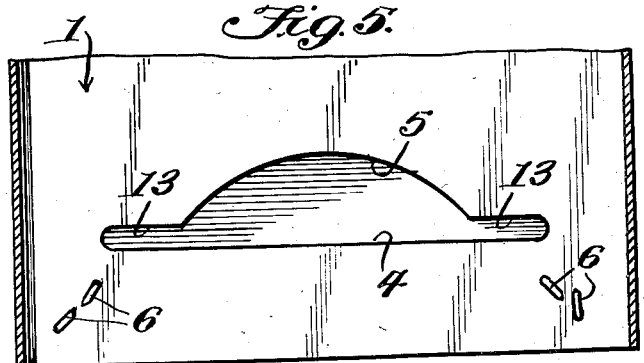
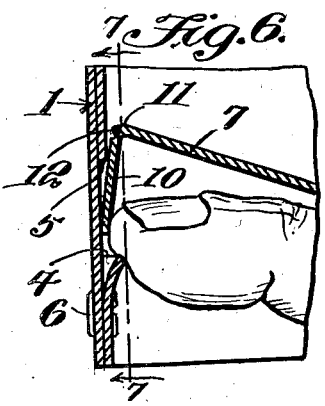
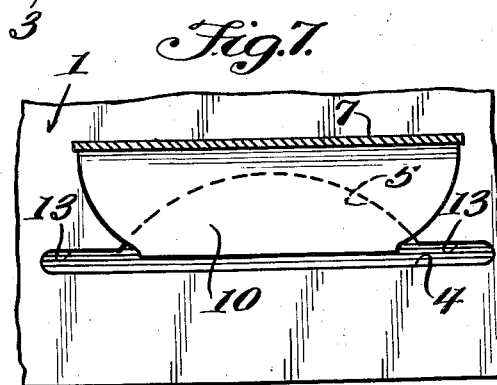
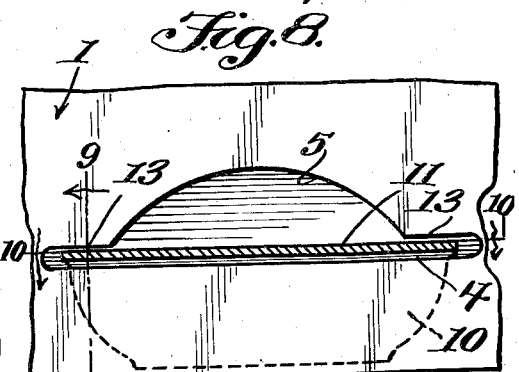
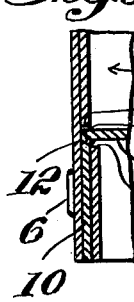
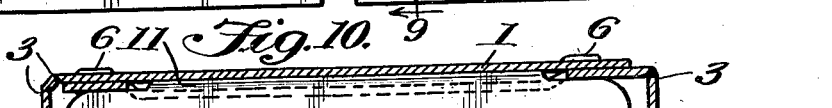
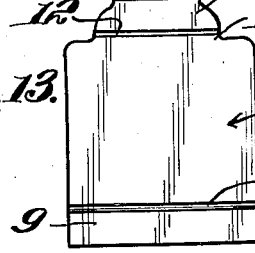
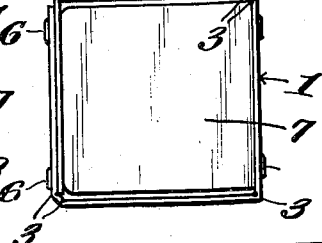
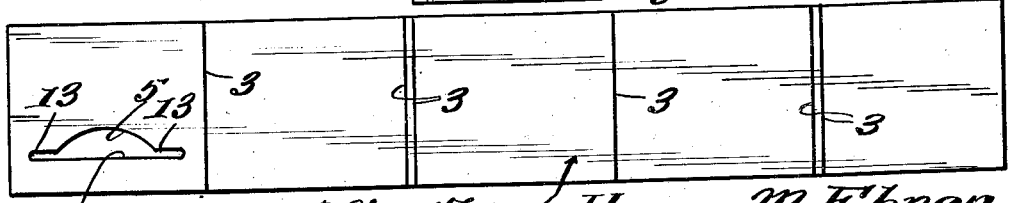
Henry M. Ebner
INVENTOR
BY Victor J. Evans & Co.
ATTORNEY
WITNESS: J. T. L. Wright Patented June 18, 1935

2,005,415

UNITED STATES PATENT OFFICE 2,005,415

FOLDING BERRY BOX

Henry M. Ebner, Cameron, Wis.

Application September 18, 1933, Serial No. 690,007

1 Claim. (Cl. 229—23)

This invention relates to fruit boxes especially adapted for berries and similar fruits and has for the primary object the provision of a box made from wood or any other suitable material and when folded will provide a compact article easily arranged for shipment or storage and only requiring a minimum space and which may be easily and quickly unfolded and set up and having an effective means for locking the bottom to a wall of the box so that the danger of collapsing is entirely obviated or the danger of the bottom moving upwardly or from box forming position.

With these and other objects in view this invention consists in certain novel features of construction, combination and arrangement of parts to be hereinafter more fully described and claimed.

For a complete understanding of my invention, reference is to be had to the following description and accompanying drawings, in which Figure 1 is a perspective view illustrating a box constructed in accordance with my invention and showing the same in a folded position.

Figure 2 is an edge view illustrating the same.

Figure 3 is a sectional view showing the walls of the box unfolded and prior to positioning of the bottom wall in box forming position.

Figure 4 is a similar view showing the bottom locked in position to complete the box.

Figure 5 is a fragmentary sectional view taken on the line 5—5 showing the slot in one of the walls of the box to receive the tongue of the body.

Figure 6 is a fragmentary sectional view showing the tongue positioned for insertion in the slot.

Figure 7 is a sectional view taken on the line 7—7 of Figure 6.

Figure 8 is a sectional view taken on the line 8—8 of Figure 4.

Figure 9 is a sectional view taken on the line 9—9 of Figure 8.

Figure 10 is a sectional view taken on the line 10—10 of Figure 8.

Figure 11 is a fragmentary perspective view showing a portion of the bottom of the box carrying the locking tongue.

Figure 12 is a top plan view illustrating the box in set up position.

Figure 13 is a plan view illustrating the bottom of the body.

Figure 14 is a plan view illustrating a blank from which the walls of the box are constructed.

Referring in detail to the drawings, the numeral 1 indicates a rectangular shaped box constructed of wood or any other material suitable for the purpose and is especially adapted for berries and like fruit. The side walls of the box are constructed from a blank 2, as shown in Fig. 14. The blank is provided with weakened portions 3 providing five panels capable of hinging relative to each other by the weakened portions 3. The panels when set up in box formation provide the sides to the box and a pair of the end panels of the blank are arranged in overlapped relation when in box formation to form one wall of the box of double thickness, as clearly shown in Figures 6 and 12. One of the end panels is provided with an elongated slot 4 and also an arcuately curved cutout portion 5 communicative with the slot 4 intermediate the ends of said slot. The panel carrying the slot 4 is arranged innermost of the box when the blank 2 is in box forming position. The end panels of the blank when folded forming the walls of the box are stapled or otherwise secured together, as shown at 6.

A bottom 7 is provided for the box and is provided with a weakened portion 8. The weakened portion 8 forms an attaching portion 9 adapted to be stapled or otherwise secured to one of the side walls of the box that is, to the side wall opposite to the side wall having the slot 4. The bottom 7 thus connected to the respective walls of the box may be positioned, as shown in Figure 1, when the walls are collapsed so that the article will require only a minimum space when in a knocked down position. The free end of the bottom 7 is cut away to form a tongue 10 and an anchoring flange 11. The flange 11 lies between the major portion of the bottom 7 and the tongue 10 and between the tongue 10 and the flange 11 is a weakened line portion 12 to permit the tongue to hinge on the flange. The slot 4 and the cut away portion 5 form shoulders 13 so that when the tongue is inserted through the slot 4 the locking flange 11 will be overlain by the shoulders 13 preventing the tongue from accidentally moving outwardly of the slot. The tongue thus locked in the slot prevents the bottom 7 from moving upwardly accidentally and thereby assures the retaining of the walls and the bottom in box formation. The cut away portion 5 facilitates the insertion of the tongue into the slot 4. One wall of the slot 4 may be flexed, as shown in Figure 6, to aid in inserting the tongue in the slot. The tongue after being inserted in the slot is confined between the two panels constituting one of the walls of the box, as shown in Figure 9, so that the tongue is entirely hidden from view both from the interior and exterior of the box. Figures 9 and 10 clearly show the locking of the bottom in an operative position by the shoulders 13 overlying the locking flange of the bottom.

A box constructed in accordance with the foregoing will be economical to manufacture and practical and durable in use and when collapsed will only require a minimum space so as to facilitate storage or shipment.

While I have shown and described the preferred embodiment of my invention, it will be understood that minor changes in construction, combination and arrangement of parts may be made without departing from the spirit and scope of my invention, as claimed.

Having described the invention, I claim:

A box comprising foldable side walls and one of said walls including inner and outer permanently connected panels, said inner panel having a slot and a cut away portion communicative with said slot to form spaced shoulders lying above the lower wall of the slot, a bottom hinged to one of the walls, a locking flange on the bottom, and a tongue hinged to the locking flange and adapted to be positioned between the panels by way of the slot and cutaway portion and the latter permitting the tongue to enter freely into the slot to bring the locking flange to underlie the shoulders for preventing accidental movement of the tongue out of said slot.

HENRY M. EBNER.